MAGNETO-RESISTIVE TRIGGER CIRCUIT

Filed April 24, 1964

INVENTOR.
MILTON GREEN

INVENTOR.
MILTON GREEN 3,379,895

MAGNETO-RESISTIVE TRIGGER CIRCUIT

Milton Green, Broomall, Pa., assignor to Burroughs Corporation, Detroit, Mich., a corporation of Michigan Filed Apr. 24, 1964, Ser. No. 362,254
12 Claims. (Cl. 307—88)

ABSTRACT OF THE DISCLOSURE

The present application discloses a magneto-resistive bistable circuit which is triggerable between its states by the application of a bipolar trigger signal. The preferred embodiment disclosed is a circuit which employs a pair of Corbino discs of indium antimonide cross-positioned in a pair of electro-magnetic fields. The proposed circuit envisions operation in a very low temperature environment. Each of the discs is cross-coupled to an opposite electromagnetic coil to achieve the required feedback action of the usual trigger circuit. A trigger coil commonly coupled to both of the electromagnets provides the circuit initiation.

The present invention relates to magneto-resistive circuits. These are devices which possess the ability to provide a variable resistance in the presence of a magnetic field. More particularly, this invention relates to a bistable trigger circuit which utilizes these magneto-resistive elements.

Magneto-resistivity is a relatively ancient phenomenon. However, wide use of the concept has been hampered by its difficult operational requirements. For example, the large magnetic field necessary to produce relatively narrow resistance variations was considered a major drawback. Recently, studies of the electrical properties of intermetallic compounds have produced many interesting developments. Possibly the most important of these is the discovery that some of these semiconducting compounds can be used to produce resistance elements which are very sensitive to changes in applied magnetic fields.

Many novel applications are possible from these effects. For example, potentiometers having no moving contacts are readily producible. Other possibilities include nonmechanical, D.C. to A.C., converters, rectifiers, transducers, as well as many other nonlinear resistance elements. The basic principle involved here relates to the discovery that the charge carriers of an electrical current flowing in a conductor are deflected to the sides of the conductor if the conductor is placed in a magnetic field perpendicular to the flow of current. As a result of this deflection there is a piling up of electrical charge on the sides of the conductor until an electric field is created which exerts a force equal and opposite to that of the applied magnetic field. Thus, a potential difference can be produced between the two sides of the conductor. This potential difference is the well-known Hall voltage.

Another consequence of this electron deflection by a magnetic field, and the one mainly of interest here, is the resistance change of the conductor, i.e., its magneto-resistance. This results mainly from the fact that not all of the current-carrying electrons have the same velocity. For a given magnetic field applied to a conductor, only those electrons flowing in the conductor with a certain average velocity will move in a straight undeflected path along the conductor. Those electrons with velocities higher or lower than the average will be deflected and thus traverse a longer path. Hence, their contribution to the conduction will be reduced and the resistance of the conductor will consequently increase.

Since the Hall field exerts a force opposite to the applied magnetic field, the presence of the Hall field tends to reduce the degree of electron deflection. That is, the magnetic field is opposed by the Hall field; hence, maximum magneto-resistance cannot be achieved in its presence. To attain any degree of magneto-resistance therefore some means is necessary to reduce or eliminate the Hall field. One device in which the Hall field is absent, discussed later, is the Corbino disc.

However, even in the absence of the Hall field, the magneto-resistance variation possible heretofore has not been sufficient to warrant its extensive use in practical devices. One major drawback has been the large magnetic fields necessary to obtain any reasonable resistance change.

Renewed interest arose in magneto-resistance devices with the rapid advance in semiconductor research when it was found that certain semiconductor materials possessed particularly large magneto-resistive effects. Indium antimonide ($I_nS_b$) is perhaps the most well-known of such semiconducting materials. Its most striking characteristic is its extremely high electron mobility of 80,000. The mobility of a material indicates the drift velocity of a charge carrier per unit electric field. Since the tangent of the Hall angle is equal to the product of the mobility and the magnetic field, it can be shown that the magneto-resistance of a Corbino disc is approximately proportional to the square of the mobility. Since the material itself (indium antimonide) has an electron mobility roughly 15 times that of germanium, the use of a Corbino disc of indium antimonide will increase the magneto-resistance by a factor of several hundred. While other semiconductors possess high mobilities, indium antimonide was used and is specified herein as the preferred material.

The attendant advantages achieved by low-temperature operation in other electronic devices has contributed a further improvement to magneto-resistive research. It has been found that by using magneto-resistance elements in low-temperature environments its magneto-resistivity sensitivity is increased still further. This increase in magneto-resistance in a low-temperature environment is discussed at length in an article by the inventor in the Journal of Applied Physics, volume 32, No. 7, at pp. 1286 through 1289, July 1961, entitled "Corbino Disc Magneto Resistivity Measurements on Indium Antimonide ($I_nS_b$)." This latest discovery, coupled with those previously noted, should make possible high-speed devices not previously attempted. The present invention contributes a still further improvement in magneto-resistive circuitry by providing a magneto-resistive circuit, utilizing regenerative principles to increase the rate of resistance change even more.

It is therefore an object of this invention to provide a means for improving the sensitivity of a magneto-resistive device.

It is a further object of this invention to provide a magneto-resistive bistable trigger circuit capable of operation by a trigger pulse source between a first and second stable resistance value whose output signal may be balanced or single-ended.

It is a still further object of the present invention to provide a bistable semiconductor magneto-resistive trigger circuit, operable at extremely low-temperatures, having regenerative characteristics to increase the rate of resistance change of a magneto-resistive device thereby improving the transition time between bistable states of a magneto-resistive trigger circuit.

Various other objects and advantages will appear in the following detailed description of a preferred embodiment of the present invention, and the novel features will be particularly pointed out hereinafter in connection with the accompanying drawings and appended claims, in which:

In summary, the present invention provides a magneto-resistive trigger circuit preferably using Corbino discs of indium antimonide in air gaps of a pair of magnetic cores. The discs respectively positioned in oppositely polarized magnetic fields are, each, serially connected to a coil winding on the opposite core. A polarized magnetic field simultaneously applied to the oppositely polarized magnetic fields increases one core's resistance and decreases the other. The cross connected coil windings accelerate the effect until a stable condition is reached in that direction. Simultaneous application of an oppositely polarized magnetic field reverses the operation until a second stable condition is reached in the alternate direction.

Figure 1:
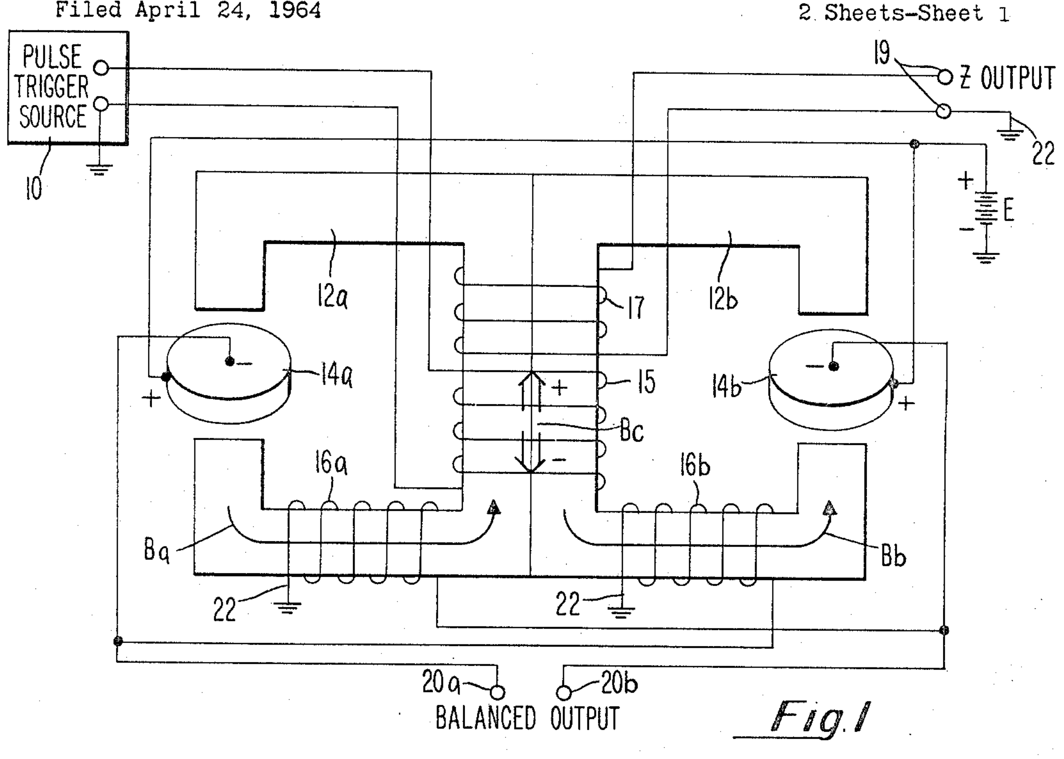
FIGURE 1 is a partial schematic, partial pictorial, embodiment of the present invention.
Figure 5:
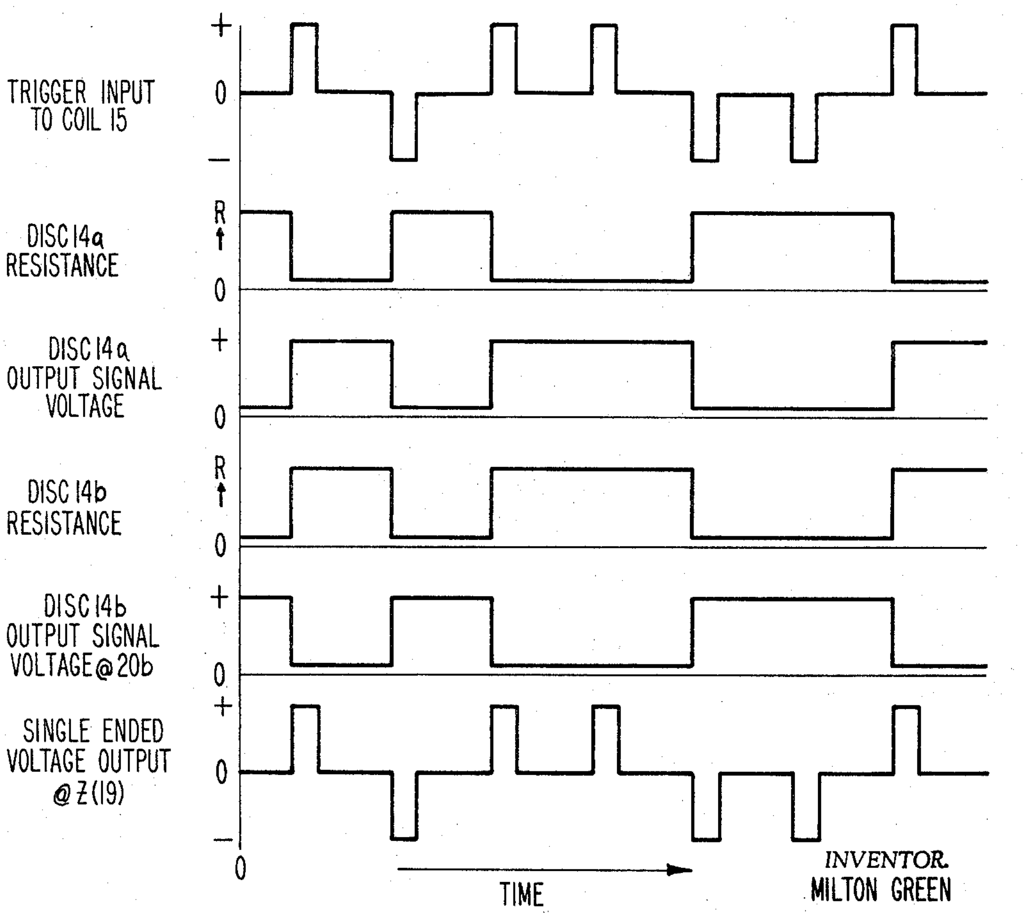
FIGURE 5 is a set of waveforms indicating the signal waveforms present at indicated points of the circuit shown in FIGURE 1.

Referring now more particularly to the drawings, FIGURE 1 shows an embodiment of the circuit in which a pulse trigger source 10 is connected for applying a train of pulses, such as illustrated by the waveform in FIGURE 5, to a trigger signal input coil 15. Coil 15 is wound about a pair of substantially closed magnetic cores 12*a* and 12*b*. The placement of the cores 12*a* and 12*b* enables the coil 15 to simultaneously apply the pulse train to both cores. The ends of each core 12*a* and 12*b* are separated slightly to form an air gap. The gaps are shown disproportionately large for purposes of clarity. A pair of Corbino discs 14*a* and 14*b* are placed in the gap of the respective cores 12*a* and 12*b*. The discs may be constructed of any one of several well-known semiconducting materials having high charge carrier mobility characteristics. However, those used in the preferred embodiment of the present device were indium antimonide ($I_nS_b$).

An output coil 17 is also wound about both cores 12*a* and 12*b* and connected to output terminals 19 to provide a single ended output from the trigger circuit.

The positive terminal (+) of constant voltage source E is commonly connected to the circumferential terminal of both Corbino discs 14*a* and 14*b*. The negative terminal (−) of the source E is connected to a fixed reference level 22.

Corbino disc 14*a* has its center terminal (−) connected to the coil 16*b* wound on the opposite core 12*b*, while disc 14*b* is connected likewise to coil 16*a* on core 12*a*. Both coils 16*a* and 16*b* are returned to a fixed reference level 22. The balanced output terminals 20*a* and 20*b* are connected to the respective junctions of the discs 14*a* and 14*b* with the output coils 16*b* and 16*a*.

Figure 3B:
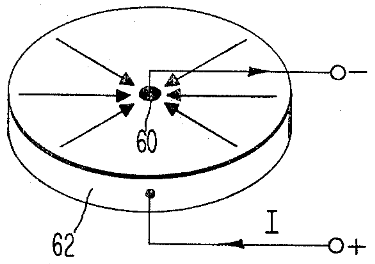
FIGURE 3B is a pictorial representation of a Corbino disc with its electrodes showing polarity and current flow directions.
Figure 3A:
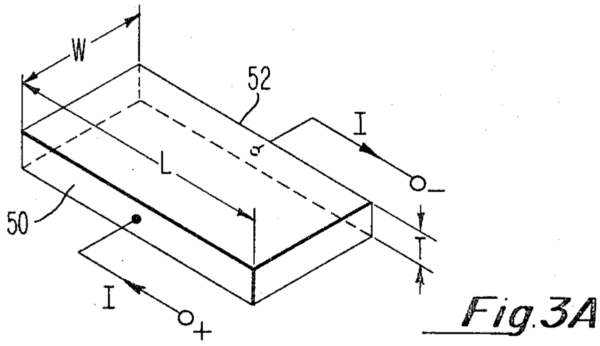
FIGURE 3A is a pictorial diagram of a rectangular magneto-resistive specimen showing its electrode connections and relative dimensions.

Before explaining the operation of the circuit of FIGURE 1, consider the pictorial representations of the magneto-resistive elements shown in FIGURES 3A and 3B.

As previously noted, the geometrical configuration of a specimen has been found to have a decided effect upon the degree of magneto-resistivity possessed by a particular material. If, for example, the specimen shown in FIGURE 3A had its length L and its width W dimensions reversed such that its width W was much greater than its length L ($W \gg L$), a considerable Hall field would be created when a magnetic field was applied to the specimen. A number of workers have shown that as the area ($L \times T$) of each of the electrodes 50, 52 is increased the Hall field is shorted out, thereby diminishing the Hall voltage. Conversely, reduction in their area increases the Hall voltage. The reason for this is, the increase in resistance is caused by the curvature of the flow path in the presence of a magnetic field. The presence of the Hall field tends to prevent this curvature. Hence, if the Hall field is shorted out the increase of resistance with magnetic field will be greater. Thus, while the shape shown in FIGURE 3A, wherein the electrodes extend the full length of the specimen, would be a very poor choice of configuration were a source of Hall voltage desired, it possesses excellent magneto-resistive qualities. This can be taken a stage further. If the disc shown in FIGURE 3B is prepared with one current electrode at the center and the other around the circumference, so that the current I flows radially as shown, from the circumferential connection 62 toward the center contact 60, then no Hall field can be set up and the magneto-resistive effect is a maximum. A specimen of the shape shown in FIGURE 3B is known as a Corbino disc. While a Corbino disc is utilized in the preferred embodiment of the present device, other geometries may be successfully used. For example, the rectangular shape shown in FIGURE 3A, as well as a number of other configurations discovered by the present inventor, are quite satisfactory. The present inventor has set forth a number of them in a publication entitled "Solid State Electronics," in volume 3, pp. 314 to 316, published by Pergamon Press, 1961, and printed in Great Britain.

Returning to FIGURE 1, assume similar characteristics for corresponding components on right and left-hand portions of the circuit. Thus, the current flowing from battery E through disc 14*a* and coil 16*b* is the same as that through disc 14*b* and coil 16*a*. Hence, the magnetic field in each gap is the same. The windings 16*a* and 16*b* are wound such that a trigger input pulse from source 10 through coil 15 generates a magnetomotive force B*c* in the common leg of cores 12*a* and 12*b* which aids the field created by one winding and opposes the field of the other. For example, if the applied magnetomotive force is positive, $+Bc$, the field B*a* is aided, causing disc 14*a* to increase its resistance, and field B*b* is opposed, causing a reduction in the resistance of disc 14*b*. The resistance increase by disc 14*a* reduces the opposed field B*b*, while the resistance decrease by disc 14*b* further aids field B*a*. The action is cumulative until the resistance of disc 14*a* has reached a maximum and disc 14*b*, a minimum. This is one stable condition for the circuit. Conversely, if the magnetomotive force generated was negative $-Bc$, the opposite stable condition would be achieved wherein the resistance of disc 14*a* is a minimum and disc 14*b*, a maximum.

The above explanation proceeded from an initial assumption of approximate balance; however, it likewise holds true for the more likely case, where the circuit is initially in one or the other of its stable states. Output pulses resulting from the switching from one stable state to the other of the circuit may be taken from a number of output terminals. For example, a single-ended output signal, i.e., one terminal grounded, may be taken from terminals 19 in the FIGURE 1. If, however, it is desired to have a balanced output, that is, neither side of the output is grounded, then the output should be taken at terminals 20*a* and 20*b*.

Figure 2:
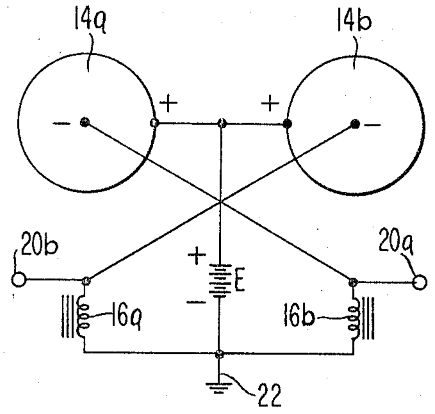
FIGURE 2 is a simplified schematic representation of the semiconductor magneto-resistive elements and their accompanying circuitry.

Referring to FIGURE 2, a simplified schematic of the circuit is shown. The reference numerals used are the same as in FIGURE 1 and relate to identical components. However, the circuit has been redrawn to more clearly illustrate its similarity to the well-known bistable flip-flop circuit. In the usual flip-flop circuit, a first and second electron path are connected across a voltage source. The paths are alternated between high and low currents. Each path has a load resistor serially connected to an electron control device. A cross connection is made from the serial connection junction of each path to the electron control device of the other path. A heavy current in one path causes a large IR drop across its load impedance and thereby lowers the junction voltage applied to the opposite electron control device to reduce the current flow through that opposite path. More simply, the driving of the low current path to a high current state causes the originally high current path to be driven to a low current state.

In FIGURE 2, the first electron path of the flip-flop may be considered to include disc 14*a* serially connected to coil 16*b*. The second electron path, therefore, is disc 14*b* serially connected to coil 16*a*. Both paths are connected across voltage source E. Each path has a load impedance 16*a* and 16*b* serially connected to an electron control device 14*b* and 14*a* respectively. The cross-coupling is accomplished physically in the present device rather than electrically; however, exactly the same purpose is achieved. A high current through the first path, disc 14*a* and coil 16*b*, causes a low current through the second path, disc 14*b* and coil 16*a*. This is achieved in a slightly different manner but again accomplishes the exact same purpose since the reduction in current through the second path is accomplished by increasing the resistance of its control device disc 14*b*, by increasing the magnetic field applied to it by coil 16*b*.

Figure 4:
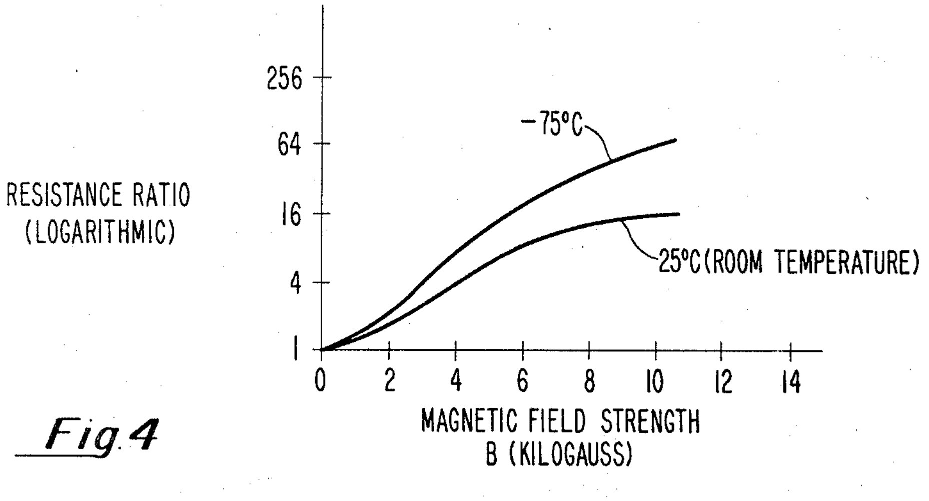
FIGURE 4 is a graphical representation of the magneto-resistivity characteristics of such a Corbino disc at various temperature environments.

FIGURE 4 graphically illustrates the resistance variation of a Corbino disc of indium antimonide under the influence of a magnetic field. It should be noted that the resistance is plotted logarithmically as a resistance ratio. Thus, the resistance ratio between the application of a magnetic field of 10 kilogauss and no applied field is 16 to 1 when the temperature is 25° C. or approximately room temperature. This is considerably increased when the temperature is lowered to −75° C. This is shown as the second curve on the graph of FIGURE 4. Using the same example of a magnetic field of 10 kilogauss, the resistance ratio is approximately 64 to 1. It was this 4-to-1 improvement in magneto-resistivity that prompted the operation of the preferred embodiment of the present device in a low-temperature environment.

FIGURE 5 is a series of waveforms plotted against a common time base. The top waveform is representative of the bidirectional trigger input signal applied to coil 15 of FIGURE 1. The next lower waveform illustrates the resistance variation of Corbino disc 14*a* of FIGURE 1. Note especially that the output voltage from that disc, shown immediately below it, is inverted. This merely indicates that the output voltage is referenced to ground terminal 22. Stated another way, it is the output signal across the coil 16*b*. The two next lower waveforms illustrate exactly the same functions of the second path of the circuit. The bottom waveform is illustrative of the signal taken from coil 17 which is referenced to ground terminal 22 to provide a single-ended output signal. This output signal is seen to be an exact reproduction of the input signal shown as the top waveform. It may be used as a means of coupling the input signal to additional locations. The balanced signal present across terminals 20*a* and 20*b* has neither side grounded. It would be represented by a combination of the voltage waveforms of FIGURE 5 shown as the third and fifth waveforms in the column.

According to the invention, the circuit consists of the use of two magnetic cores each having a semiconducting specimen positioned in its flux path. The specimens are preferably in the shape of Corbino discs, of high mobility material, such as indium antimonide ($I_nS_b$). Three or four coils are wound about the two magnetic cores in a manner such as to enable bistable operation of the circuit. The switching of the bistable circuit from one of its stable states to the other is caused by an external trigger pulse applied to one of the coils.

One of the principal advantages of the circuit is its ability to handle large amounts of power. Others include its simplicity and its ability to make available multiple independent output points which are either balanced or unbalanced with respect to a ground reference level. It is also capable of providing output signals which are exact reproductions of input signals.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A magneto-resistive triggerable flip-flop circuit comprising a first and a second stage, each of said stages including a magnetic flux path device having means of providing a flow of magnetic flux along said path, and a magneto-resistive element positioned in said path and responsive to said flux flow, said magneto-resistive element, positioned in said first stage, electrically connected to the flux flow providing means on the magnetic flux path device of the second stage and vice versa to thereby provide each stage of the flip-flop with a feedback loop whereby the required regeneration, of said flip-flop circuit during its triggered transition period, is accomplished magneto-resistively.

2. The flip-flop circuit as set forth in claim 1, wherein the magneto-resistive elements are bodies of semiconductor material respectively positioned in air gaps in substantially closed flux flow paths of the magnetic field providing means.

3. The flip-flop circuit as set forth in claim 1, wherein the said magnetic field providing means in each of said stages is an electromagnet.

4. The flip-flop circuit as set forth in claim 3, wherein the electromagnets are magnetic cores with coils respectively wound thereon.

5. The flip-flop circuit as set forth in claim 3 wherein the electromagnets comprise separate halves of a three-legged core, each half including an adjacent portion of the common center leg of said core and one of its end legs.

6. A magneto-resistive trigger circuit comprising a three-legged magnetic core, the two end legs of said three-legged core each having a flux providing coupling coil correspondingly wound thereon and a magneto-resistive element positioned therein, each coupling coil serially cross-connected to the opposite magneto-resistive element, a power source connected to both of said flux providing coupling coils through their respective magneto-resistive control elements, a trigger signal coil wound on the common center leg of said three-legged core and connected to a source of bidirectional trigger signals, whereby the application of a trigger signal in either direction will simultaneously initiate a flux flow in said common center leg in a direction to aid the flux flow provided by one and oppose that provided by the other of said coupling coils, the sum of said aided flux increasing, and the difference of said opposed flux decreasing, the resistance of the respective magneto-resistive element positioned in its path to thereby regeneratively affect transitions by said trigger circuit between its opposite states in response to bidirectional trigger signals.

7. A magneto-resistive trigger circuit comprising a first and a second magnetic core, each having a coupling coil correspongindly wound thereon to provide a similarly directed flow of magnetic flux along the flux path of said core, a first magneto-resistive control element mechanically positioned in the flux path of said first core and electrically connected to the coupling coil on said second core, a second magneto-resistive control element positioned in the flux path of said second core and connected to the coupling coil on said first core, a power source connected to both of said coupling coils through their respective magneto-resistive control elements, a trigger signal coil wound on each of said magnetic cores, a source of bidirectional trigger signals commonly connected to both of said trigger coils in a polarized direction to enable a trigger signal in one direction to simultaneously initiate a flow of magnetic flux in opposite directions in said cores and a trigger signal in the other direction to simultaneously initiate a reverse flow in both of said cores whereby each trigger signal will simultaneously initiate a flux flow in a direction to aid the flux flow provided by one and oppose that provided by the other of said coupling coils, the sum of said aided flux increasing, and the difference of said opposed flux decreasing, the resistance of the respective magneto-resistive element positioned in its path to thereby regeneratively affect transitions by said trigger circuit between its opposite states in response to bidirectional trigger signals.

8. A flip-flop circuit comprising a magnetic core having a first and a second magnetic flux flow path, each being capable of having lines of magnetic flux oriented in a first or second direction, a magneto-resistive control element mechanically positioned in each flux path, each having a pair of electrical terminals, a first coil coupled to the first flux path of said magnetic core and a first coil coupled to the second flux path of said magnetic core, a power source, circuit means interconnecting said power source to said first coil of said first magnetic flux path and said electrical terminals of the magneto-resistive control element of said second magnetic flux path and to said first coil of said second magnetic flux path and said electrical terminals of the magneto-resistive control element of said first magnetic flux path, said circuit means and coils being so related as to cause the control element of said first magnetic flux path to exhibit a high resistance, trigger signal coil means coupled to said magnetic core linking both of said flux paths and having terminals for receiving trigger signals of a first or second direction, the application of a trigger signal of a first direction causing flux aiding in said second path and flux cancellation in said first path so as to regeneratively reverse the bistable state of said flip-flop circuit by causing the control element of said second magnetic flux path to exhibit a high resistance, the application of a trigger signal in a second direction causing said flip-flop circuit to return to its original condition and output circuit means for sensing the relative resistance of at least one of said control elements.

9. The flip-flop circuit as set forth in claim 8 wherein each of said magneto-resistive control elements is a rectangularly shaped body of semiconducting material having a length whose magnitude is at least four times greater than its width, each of said semiconducting bodies having a first and a second electrode respectively attached for electrical connection along its opposite lengthwise edges, said electrode attachments being substantially equal in area to said lengthwise edges.

10. The flip-flop circuit as set forth in claim 9, wherein said semiconducting material is indium antimonide ($I_nS_b$).

11. The flip-flop circuit as set forth in claim 8 wherein each of said magneto-resistive control elements is a Corbino disc of semiconducting material, each disc having a first electrode electrically connected to its approximate center and a second electrode circumferentially attached for electrical connection about the cylindrical surface of said disc.

12. The flip-flop circuit as set forth in claim 11, wherein the Corbino discs of semiconducting material are Corbino discs of indium antimonide ($I_nS_b$).

References Cited

UNITED STATES PATENTS 2,924,673 2/1960 Duinker ............ 307—88

OTHER REFERENCES

Publication I, Westinghouse Engineer, "The Hall Effect and Its Uses" by Lawson, Jr. vol. 17, No. 3, pp. 71–73, 307–88.

BERNARD KONICK, *Primary Examiner.*

STANLEY M. URYNOWICZ, *Examiner.*